Nov. 7, 1939.   R. KORMANN   2,178,796
PROTRACTOR DEVICE
Filed May 3, 1939
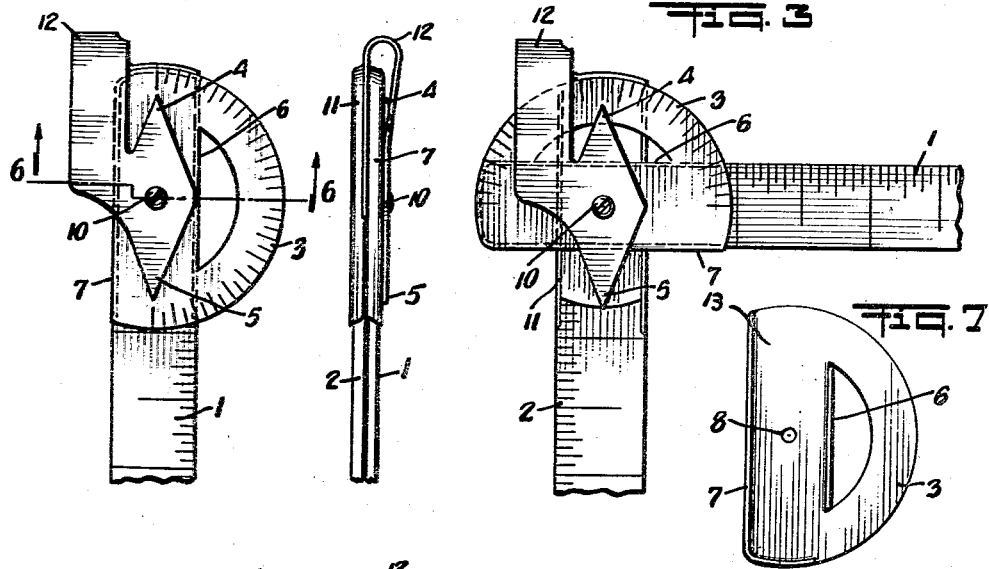
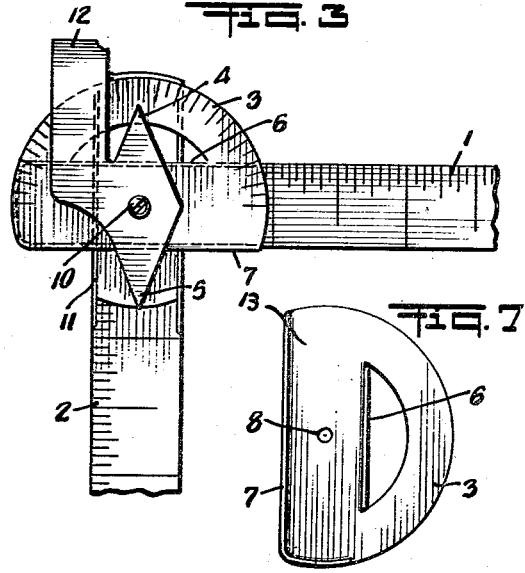
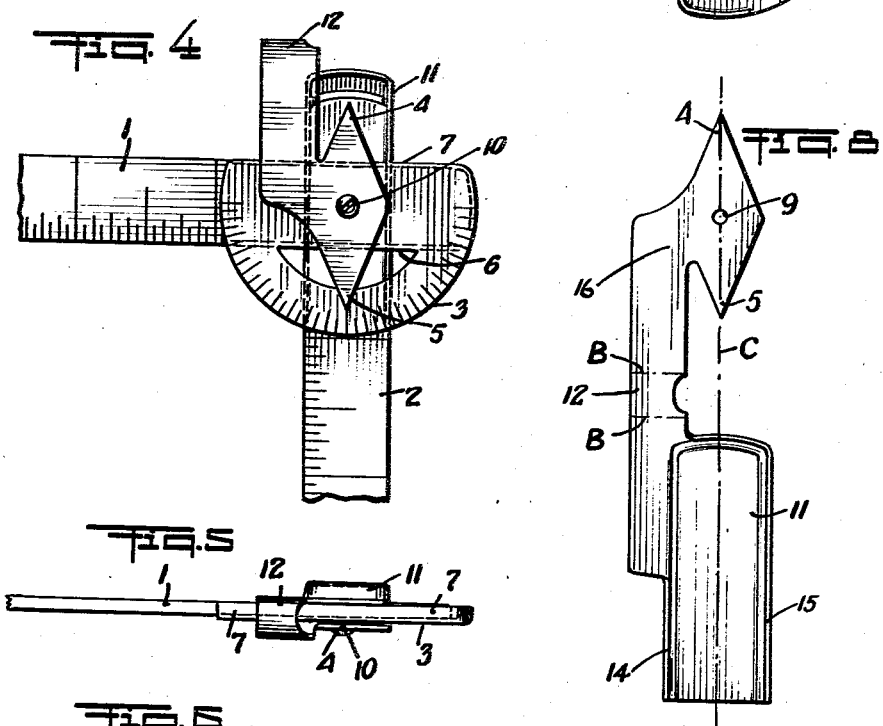
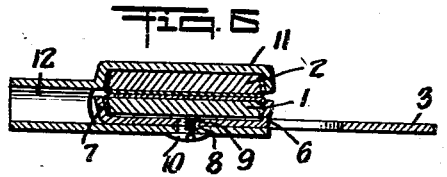
INVENTOR.
Robert Kormann
BY Mock & Blum
ATTORNEYS Patented Nov. 7, 1939

2,178,796

UNITED STATES PATENT OFFICE 2,178,796

PROTRACTOR DEVICE

Robert Kormann, Astoria, Long Island, N. Y.

Application May 3, 1939, Serial No. 271,448

4 Claims. (Cl. 33—115)

My invention relates to protractors and more particularly to an attachment to be used in combination with a folded rule providing thereby a protractor, miter or square as may be desired.

The principal object of my invention is to provide a simple attachment for a folding rule of usual construction, which attachment shall serve to indicate the degree of angularity between any two pivoted arms of the rule to which it is attached.

Another object of my invention is to provide an angle measuring device for the pivoted arms of a folded rule, which is capable of measuring the angle by means which operate wholly outside of the pivot and thereby offer no impediment to the full use of the rule by obstructing in any manner the space between the pivoted arms, said space defining the angle.

Another object of my invention is to provide a protractor attachment for a folded rule which can be as easily attached to the center of the rule, for example, or to any part thereof, thereby affording square or miter means with an angle having its lengths of legs limited only by the length of the rule itself.

Another object of my invention is to provide a protractor device which will indicate the angle between two arms of a folded rule without interfering with the space between said angle and since the legs of said angle are the pivoted sections of said rule, the combination can be used to measure angles which are ordinarily inaccessible by grasping one of said legs and projecting the angle portion where the angle is to be measured.

Another object of my invention is to provide a protractor device having a two way indicator for laying out and measuring angles from zero to 180 degrees.

Another object of my invention is to provide a protractor device, the sections of which can be easily stamped out of metal or other suitable material.

Another object of my invention is to provide a protractor device which will automatically adjust or accommodate itself to the pivot of the folded rule section.

Other objects of my invention will appear in the following description, the preceding statement of the objects of my invention being intended to generally describe the same and not to limit it in any manner.

Fig. 1 is a front view of my protractor device attached to a folded rule, the angle registered being zero.

Fig. 2 is a side view of the same.

Fig. 3 is a front view of the pivoted rule arms at an angle and my attachment in operative position thereon, said rule arms forming approximately an angle of 90 degrees.

Fig. 4 is a view similar to Fig. 3, in which the angle formed by the rule arms is an adjacent angle to the angle formed by the rule arms in Fig. 3.

Fig. 5 is a top view of Fig. 4.

Fig. 6 is a section through the line 6—6 of Fig. 1.

Fig. 7 is a rear view of the one of the channel shaped sections which forms the housing of the device in combination with the section illustrated in Fig. 8.

Fig. 8 is a plan view of the second channel shaped section which forms the housing of the device, the indicator being shown bent away.

Referring to the drawing, the usual folded rule shown therein has the arms 1 and 2, said arms being pivotally connected in the usual manner. This folded rule is well known in the art and forms no part of my invention per se.

The protractor attachment comprises a bifurcated housing having the body sections 13 and 11, which are of general concavo-convex cross section. These sections abut each other by their respective edges 6, 7, 14 and 15 which are bent as illustrated to form channel shaped sections 11 and 13.

The front section 13 is provided with a semi-circular arm 3 which may be integral therewith as shown in Fig. 7. Arm 3 is formed with a plurality of graduations which may be stamped on the upper surface of said arm. These graduations extend from zero to 180 degrees. The front section 13 is further provided with a hole 8 which is countersunk on the inner face of section 13 so that no part of bolt 10 projects into the hollow of the housing.

The rear section 11 is provided with an arm 16 which extends upwardly and laterally from said rear section 11. Extending laterally from the other end of arm 16 are the indicators 4 and 5. Arm 16 is folded at fold lines B B to form a substantially U-shaped member. The intermediate part of arm 16 is designated by the reference numeral 12.

My device is assembled as follows:

The two sections are brought into contiguous relationship with each other so that the concave portions of channel shaped members 13 and 11 face each other and the upper edge of side 7 abuts the upper edge of side 14, and the upper edge of side 6 abuts the upper edge of side 15. When members 13 and 11 have been placed in this position, the indicia portion is enclosed by the indicator portion and hole 9 located midway between indicators 4 and 5 registers concentrically with hole 8 formed in channel shaped member 13. Pin 10 is then fixed in said holes enabling the members to freely pivot about said pin.

My protractor device may be employed in combination with a folded rule in the following manner:

The end portion of any pivoted section of the folded rule is inserted into the housing of my device as shown in Figs. 1 and 2. Pin 10 is brought as near as possible to the pivot center of the rule arms. Any eccentricity which might still exist is overcome by swinging the rule arms around its pivot, thus bringing pin 10 and the ruler pivot in concentric relation. This self centering feature forms an important part of my invention.

In the position shown in Figs. 1 and 2, the arms 1 and 2 are superimposed, the indicator 4 registering zero degrees. The arm 1 may then be pivoted in respect to the arm 2 into the position shown in Fig. 3, the pin 10 and graduated arm 3 travelling with said arm 1. The arm 2, however, together with the indicators 4 and 5 remain stationary and the graduated arm 13 moving in respect to the indicator 4 enables the angle to be determined. In the position shown in Fig. 4, the angle is measured with indicator 5.

It will be noted that a further and important feature of my invention consists in the provision of a two-way indicator so that indicators 4 and 5 will substantially measure a 360 degree full swing. In this manner adjacent and opposite angles formed by the arms of the folded rule may be measured.

It will also be noted that an angle having longer legs may be easily obtained by merely attaching the device to a pivoted section somewhat in the center of the folded rule, whereby, when the several sections are unfolded, the lengths of the legs are increased. It will be further noted that where the angle to be measured is inaccessible to the operator, the device may be attached to an extreme end section of the pivoted rule and by unfolding and grasping the opposite end, the protractor may be projected as far as the length of the folded rule permits.

The housing may be fabricated of thin, resilient sheet metal. However, a phenol-formaldehyde resinous condensation product such as "Bakelite" may be used for the material of the housing.

I have shown a preferred embodiment of my invention but it is obvious that numerous changes and omissions may be made without departing from its spirit.

This application is a continuation in part of my application Serial No. 197,367, filed March 22, 1938.

I claim:

1. A measuring device comprising a housing having front and rear body members which are adapted for pivotal movement in respect to each other, a pin on said front body member, a plate provided with graduations on said front body member, an arm connected at one of its ends to the rear body member and pivotally secured to said pin at its other end, said arm being provided with an indicator which assumes various positions in respect to the graduations of said plate when said body members are pivotally moved in respect to each other.

2. A protractor device for use with a folded rule comprising a bifurcated housing of front and rear body members having abutting edges and an open end, for the insertion into said housing of the pivoted end portion of one section of a folded rule, said body members being adapted for pivotal movement with respect to each other, a curved plate having graduations thereon connected to the outer face of said front body member, a pin connected to the outer face of said front body member, an arm rigidly connected at one of its ends to said rear body member and its ends to said rear body member and pivotally connected at the other of its ends to said pin, and means on said arm for indicating on said curved plate the angular relation of the section members of said folded rule.

3. A measuring device as claimed in claim 1, in which the indicator is a two-way indicator.

4. A protractor device as claimed in claim 2 in which the indicator is a two-way indicator.

ROBERT KORMANN.